(12) United States Patent
Lin et al.

(10) Patent No.: US 9,071,126 B2
(45) Date of Patent: Jun. 30, 2015

(54) WIRELESS POWER TRANSMISSION DEVICE

(71) Applicant: AU Optronics Corp., Hsin-Chu (TW)

(72) Inventors: Huang-Ti Lin, Hsin-Chu (TW);
Yueh-Han Li, Hsin-Chu (TW);
Tsung-Shiun Lee, Hsin-Chu (TW);
Jia-Wei Liu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 242 days.

(21) Appl. No.: 13/751,131

(22) Filed: Jan. 27, 2013

(65) Prior Publication Data

US 2014/0092659 A1    Apr. 3, 2014

(30) Foreign Application Priority Data

Sep. 28, 2012  (TW) .............................. 101135998 A

(51) Int. Cl.
H02M 7/06      (2006.01)
H01F 27/42     (2006.01)
H01F 37/00     (2006.01)
H01F 38/00     (2006.01)
H02J 5/00      (2006.01)

(52) U.S. Cl.
CPC . *H02M 7/06* (2013.01); *H02J 5/005* (2013.01)

(58) Field of Classification Search
CPC ......... H02M 7/02; H02M 7/06; H02M 7/217; H02J 7/025; H02J 5/00; H02J 5/005; H02J 17/00; H04B 5/0037; H01F 38/14; B60L 11/182
USPC ............ 363/15–21.18, 44–48, 74, 79, 84, 89, 363/97, 126, 127, 165; 323/207–211, 323/222–228, 235, 236, 271–275, 282–287, 323/351; 307/17, 104, 106–108; 320/108, 320/109; 333/219; 455/127.1–127.5, 455/41.1–42, 522, 572, 573
See application file for complete search history.

(56) References Cited

U.S. PATENT DOCUMENTS

| 7,023,713 | B2 * | 4/2006 | Liao ............................ 363/56.11 |
| 8,093,758 | B2 * | 1/2012 | Hussmann et al. ........... 307/105 |
| 2004/0047166 | A1 * | 3/2004 | Lopez-Santillana et al. ... 363/89 |
| 2007/0109708 | A1 * | 5/2007 | Hussman et al. ............. 361/113 |

(Continued)

FOREIGN PATENT DOCUMENTS

| CN | 101645619 A | 2/2010 |
| CN | 102195366 A | 9/2011 |

(Continued)

*Primary Examiner* — Timothy J Dole
*Assistant Examiner* — Carlos Rivera-Perez
(74) *Attorney, Agent, or Firm* — Winston Hsu; Scott Margo

(57) ABSTRACT

A wireless power transmission device includes a power transmitter, a first transmission unit, a power receiver, a feedback regulator, a receive controller, and a second transmission unit. The power transmitter is for generating power, and the first transmission unit is for wirelessly transmitting power generated by the power transmitter. The power receiver is for receiving and rectifying the power from the first transmission unit. The feedback regulator is for receiving a feedback signal from the power receiver to generate an AC control signal. The receive controller is for receiving the control signal to generate a driving signal. The second transmission unit is for wirelessly transmitting the control signal to the receive controller.

6 Claims, 24 Drawing Sheets

(56) References Cited

U.S. PATENT DOCUMENTS

| | | |
|---|---|---|
| 2008/0157735 A1 | 7/2008 | Liu |
| 2009/0278666 A1* | 11/2009 | Yoda et al. ............... 340/10.34 |
| 2011/0227420 A1 | 9/2011 | Urano |
| 2012/0161536 A1 | 6/2012 | Kamata et al. |
| 2012/0164943 A1 | 6/2012 | Bennett |
| 2013/0015720 A1 | 1/2013 | Shimokawa |

FOREIGN PATENT DOCUMENTS

| | | |
|---|---|---|
| CN | 202384849 U | 8/2012 |
| TW | M298279 | 9/2006 |
| TW | I332134 | 10/2010 |
| TW | 201236302 A | 9/2012 |
| WO | 2011099071 A1 | 8/2011 |

\* cited by examiner

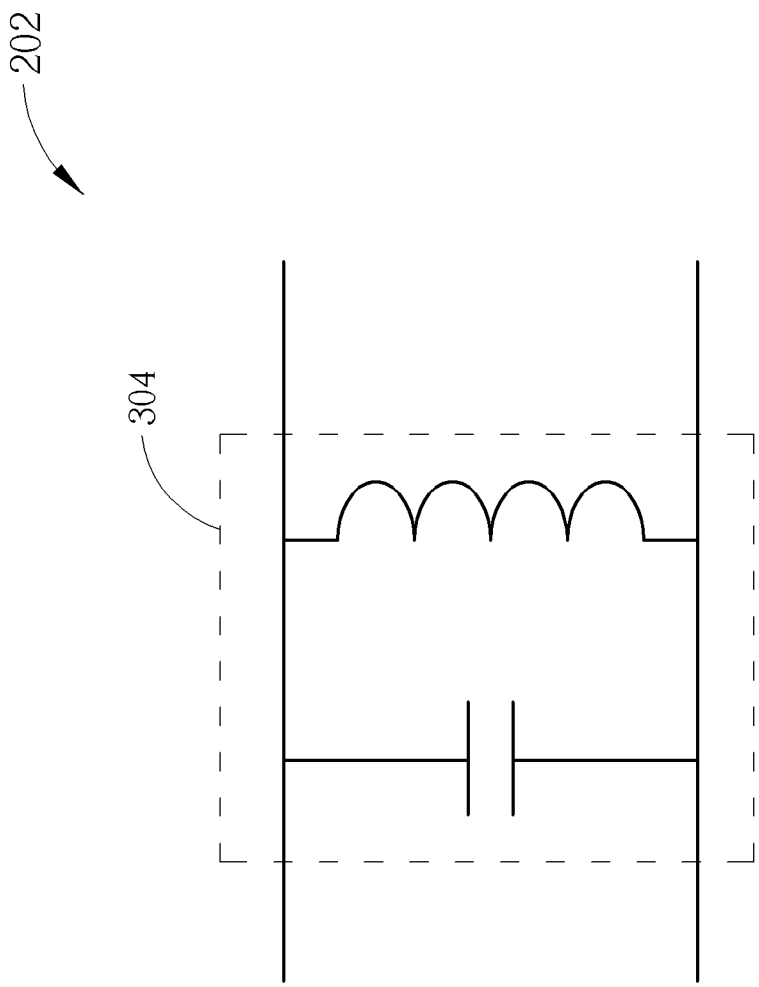

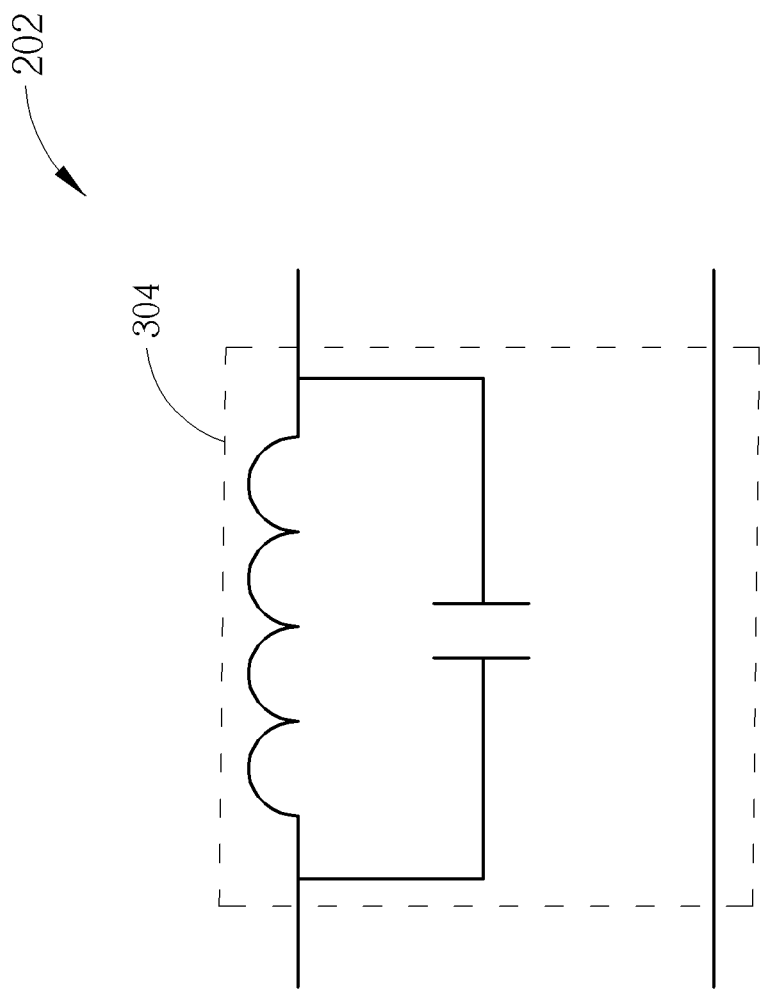

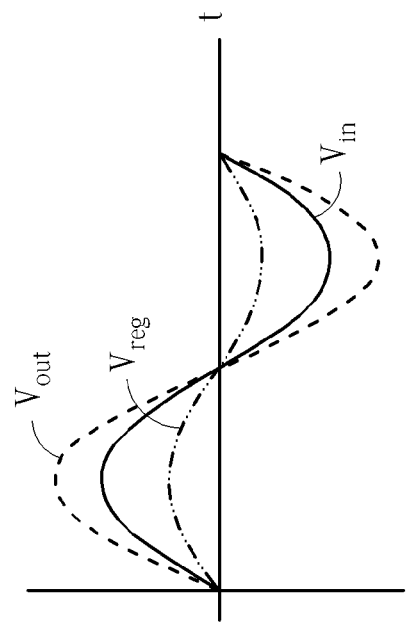
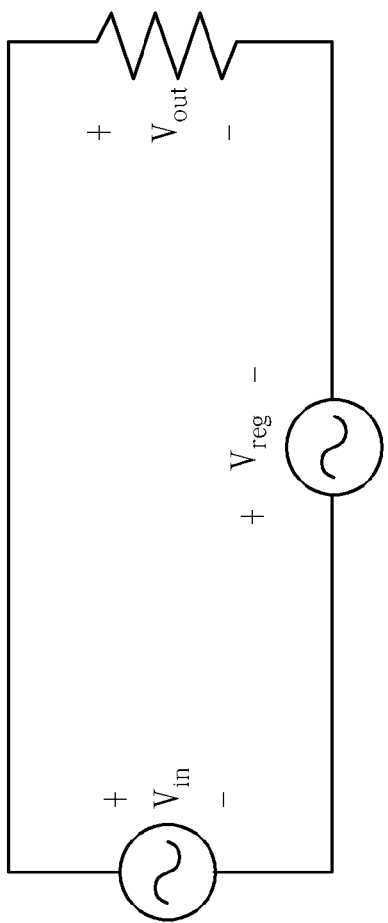
FIG. 12C

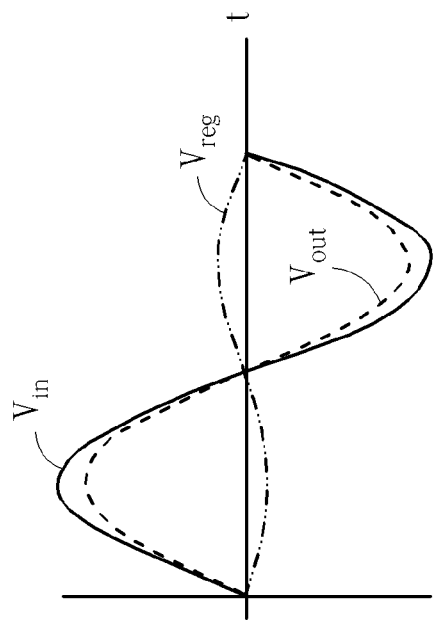
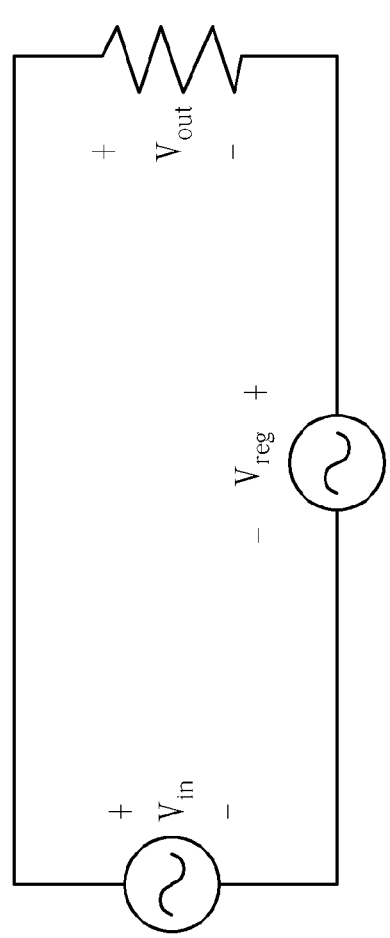
FIG. 12D

WIRELESS POWER TRANSMISSION DEVICE

CROSS-REFERENCE TO RELATED APPLICATIONS

This application claims the benefit of priority to Taiwan Patent Application No. 101135998, filed Sep. 28, 2012 and now Taiwan Patent No. 1473382, both included herein by reference in their entireties.

BACKGROUND OF THE INVENTION

1. Field of the Invention

The present invention is related to a wireless power transmission device, and more particularly, to a wireless power transmission device having feedback control.

2. Related Art

Wireless charging technology which utilizes non-contact wireless power transmission has been widely applied to mobile devices such as consumer electronics, smart phones, and tablet computers.

Please refer to FIG. 1. FIG. 1 is a diagram illustrating a prior art wireless charging module 100. The wireless charging module 100 includes a power transmitter 102, a power receiver 104, and a transmission unit 106. The transmission unit 106 utilizes inductive coils 108 and 110 as an antenna for transmitting and receiving power. A radio frequency identification (RFID) system is included in the design of the wireless charging module 100 in order that an RFID feedback signal from the power receiver 104 can be transmitted to the power transmitter 102 by utilizing the same inductive coils 108 and 110 for controlling power transfer between the power transmitter 102 and the power receiver 104.

Due to the fact that the RFID feedback signal's operating frequency is about several megahertz (MHz) and the RFID feedback signal is transmitted via the same inductive coils used to transmit power, the same inductive coils are required to transfer power and the RFID feedback signal. Thus the RFID feedback signal waveforms may be distorted by voltages induced by the power transmission on the inductive coils, thereby interfering the RFID feedback signal and causing control errors and instability of the wireless charging module 100. The higher the power transmission is, the more severe the interference becomes. As a result, applications of wireless charging technology are limited and cannot be applied to higher power transfer.

SUMMARY OF THE INVENTION

An embodiment of the present invention discloses a wireless power transmission device. The wireless power transmission device comprises a power transmitter, a first transmission unit, a power receiver, a feedback regulator, a receive controller, and a second transmission unit. The power transmitter generates power. The first transmission unit is coupled to the power transmitter for wirelessly transmitting the power generated by the power transmitter. The power receiver is coupled to the first transmission unit for receiving and rectifying the power from the first transmission unit. The feedback regulator comprises a feedback receiver and a command adjuster. The feedback receiver is coupled to the power receiver for receiving a feedback signal from the power receiver. The command adjuster is coupled to the feedback receiver for generating an AC control signal. The receive controller comprises a feedback judge controller and a control adjuster. The feedback judge controller receives the control signal. The control adjuster is coupled between the feedback judge controller and the power transmitter for generating a driving signal. The second transmission unit is coupled between the feedback regulator and the receive controller for wirelessly transmitting the control signal to the receive controller.

Another embodiment of the present invention discloses a wireless power transmission device. The wireless power transmission device comprises a power transmitter, a first transmission unit, a power receiver, a feedback circuit, a phase feedback circuit, a controller, and a regulator device. The power transmitter generates power. The first transmission unit is coupled to the power transmitter for wirelessly transmitting the power generated by the power transmitter. The power receiver is coupled to the first transmission unit for receiving and rectifying the power from the first transmission unit. The feedback circuit is coupled to the power receiver for detecting a rectified output voltage of the power receiver to generate a feedback control signal. The phase feedback circuit is coupled to the power receiver for detecting a phase of an input voltage of the power receiver to generate a phase signal. The controller is coupled between the feedback circuit and the phase feedback circuit for generating a compensating voltage according to the feedback control signal and the phase signal. The regulator device is coupled between the controller and the power receiver for generating a regulating voltage according to the compensating voltage to regulate a pre-rectified output voltage of the power receiver by an in phase form or an out of phase form.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4A is a diagram illustrating the first compensating circuit according to an embodiment.

FIG. 4B is a diagram illustrating the first compensating circuit according to another embodiment.

FIG. 12C is a diagram illustrating operations of the regulator device.

FIG. 12D is another diagram illustrating operations of the regulator device.

DETAILED DESCRIPTION

Figure 1:
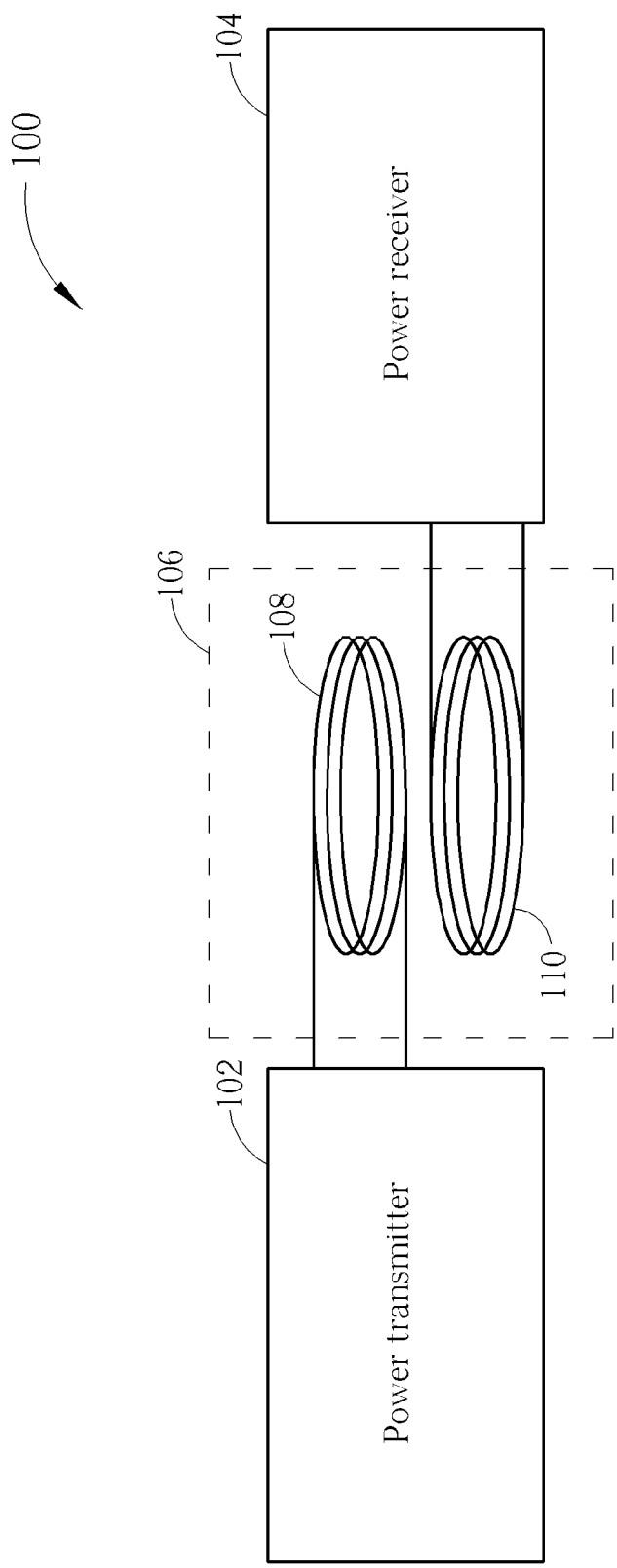
FIG. 1 is a diagram illustrating a prior art wireless charging module.
Figure 2:
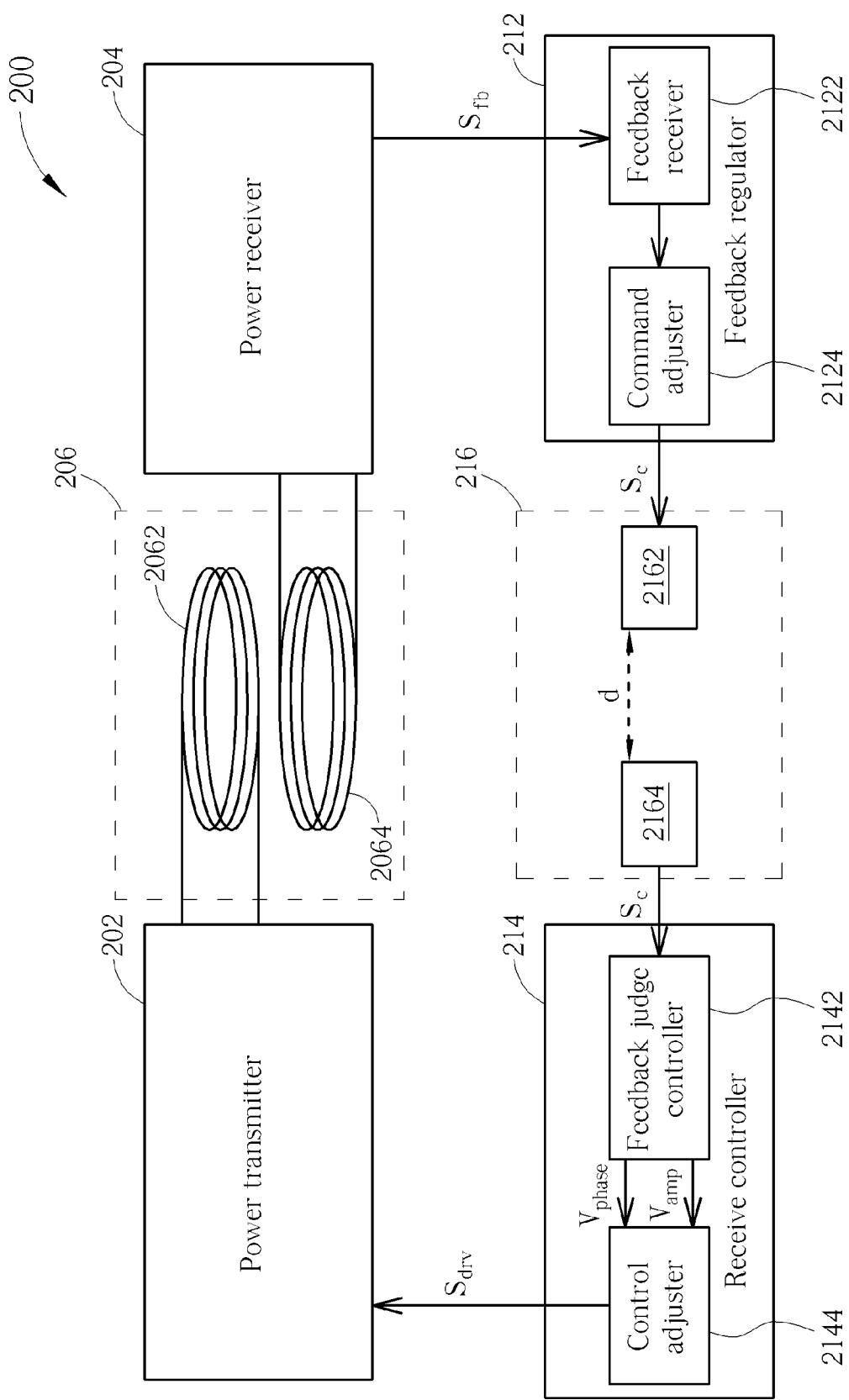
FIG. 2 is a diagram illustrating a wireless power transmission device according to an embodiment of the present invention.

Please refer to FIG. 2, which is a diagram illustrating a wireless power transmission device 200 according to an embodiment of the present invention. The wireless power transmission device 200 may include a power transmitter 202, a first transmission unit 206, a power receiver 204, a feedback regulator 212, a receive controller 214, and a second transmission unit 216. The first transmission unit 206 may include a first inductive element 2062 and a second inductive element 2064. The feedback regulator 212 may include a feedback receiver 2122 and a command adjuster 2124. The receive controller 214 may include a feedback judge controller 2142 and a control adjuster 2144. The second transmission unit may include a first conductive element 2162 and a second conductive element 2164.

Figure 3A:
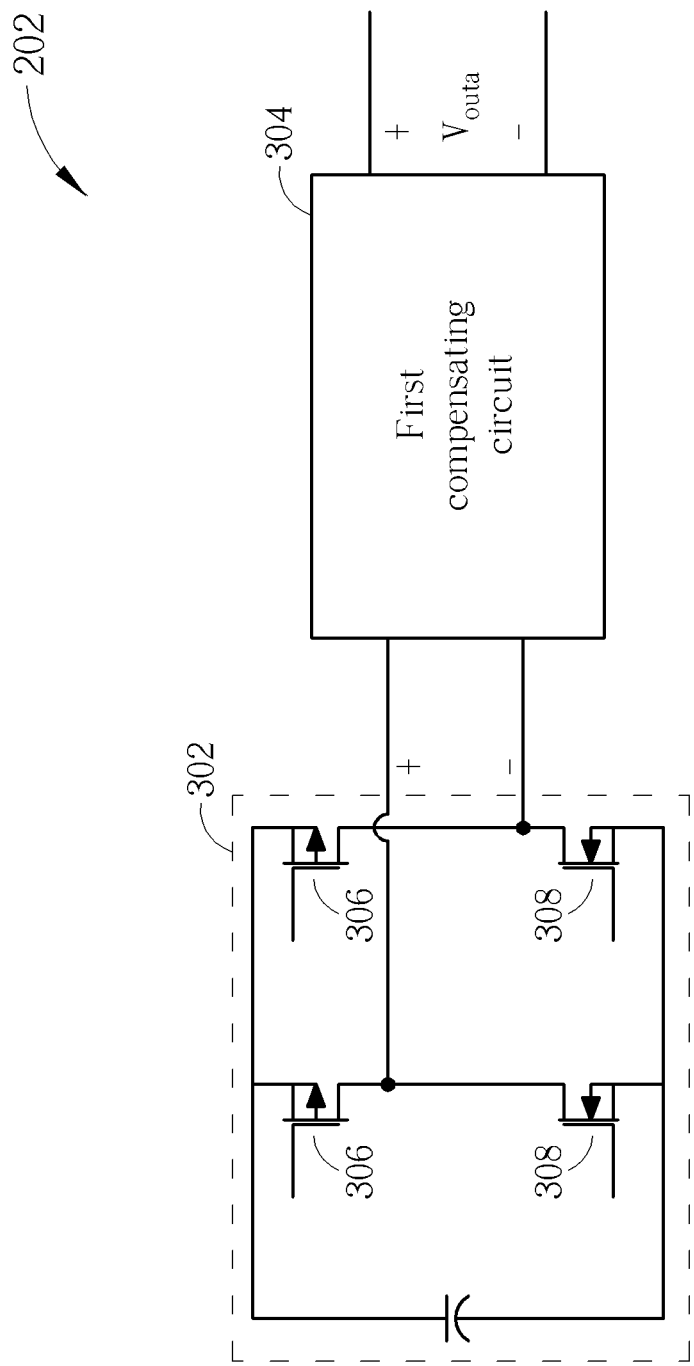
FIG. 3A is a diagram illustrating the power transmitter according to an embodiment.
Figure 3B:
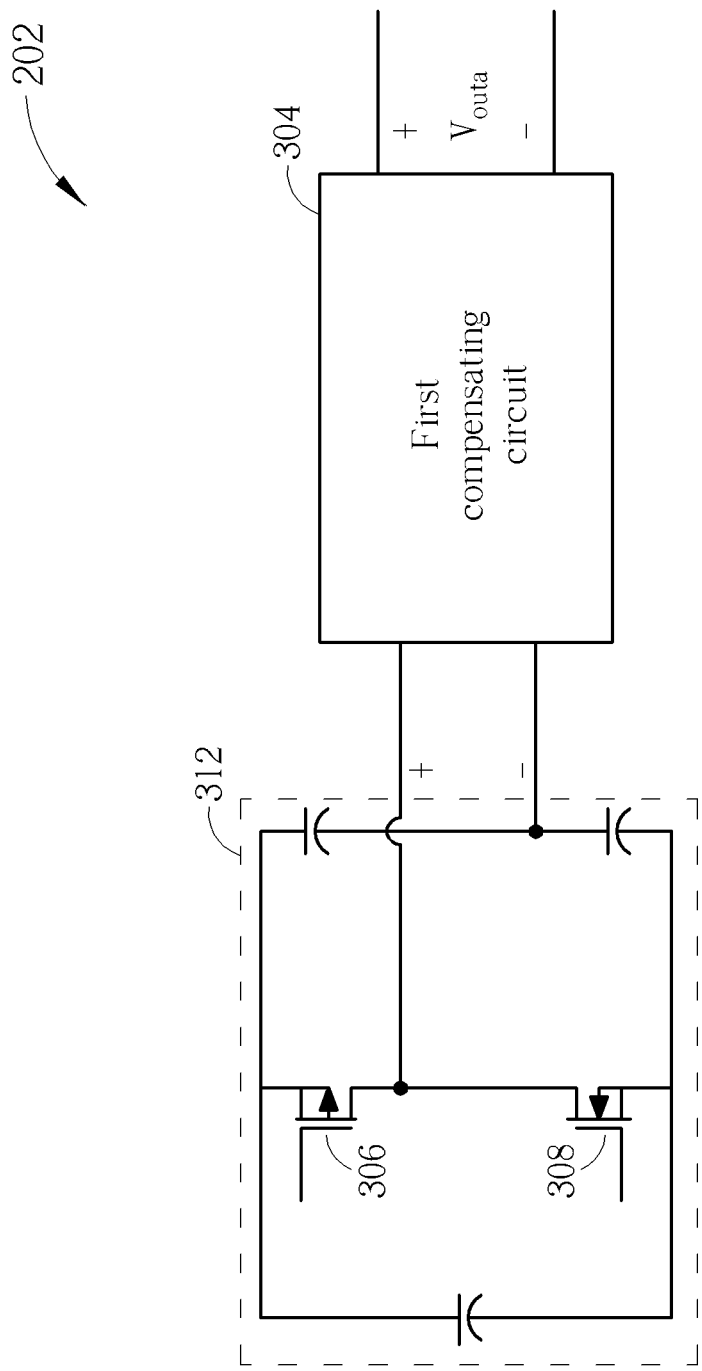
FIG. 3B is a diagram illustrating the power transmitter according to another embodiment.

The power transmitter 202 is used to convert DC voltage to AC voltage having a predetermined frequency and amplitude. FIG. 3A is a diagram illustrating the power transmitter 202 according to an embodiment. FIG. 3A shows a full bridge converter 302 and a first compensating circuit 304. FIG. 3B is a diagram illustrating the power transmitter 202 according to another embodiment. FIG. 3B shows a half bridge converter 312 and the first compensating circuit 304. PMOSs 306 and NMOSs 308 may be MOSFET, BJT, or IGBT transistors. $V_{outa}$ is AC voltage outputting from the power transmitter 202 to the first inductive element 2062. FIG. 4A is a diagram illustrating the first compensating circuit 304 according to an embodiment. The first compensating circuit 304 in FIG. 4A includes a capacitor and an inductor connected in parallel with the converter. FIG. 4B is a diagram illustrating the first compensating circuit 304 according to another embodiment. The first compensating circuit 304 in FIG. 4B includes a capacitor and an inductor connected in series with the converter. The inductor may be removed from the first compensating circuit 304, leaving only the capacitor connected in parallel or in series with the converter to form the first compensating circuit 304.

The first transmission unit 206 wirelessly transmits power generated by the power transmitter 202. The first inductive element 2062 is coupled to the power transmitter 202. The second inductive element 2064 is coupled to the power receiver 204. The first inductive element 2062 and the second inductive element 2064 may be inductive coils wound by multi-stranded wires and may induce the power to the power receiver 204 via magnetic coupling by continuously alternating magnetic field directions. Each inductive element may be formed respectively by connecting a plurality of inductive coils in series or in parallel.

Figure 5A:
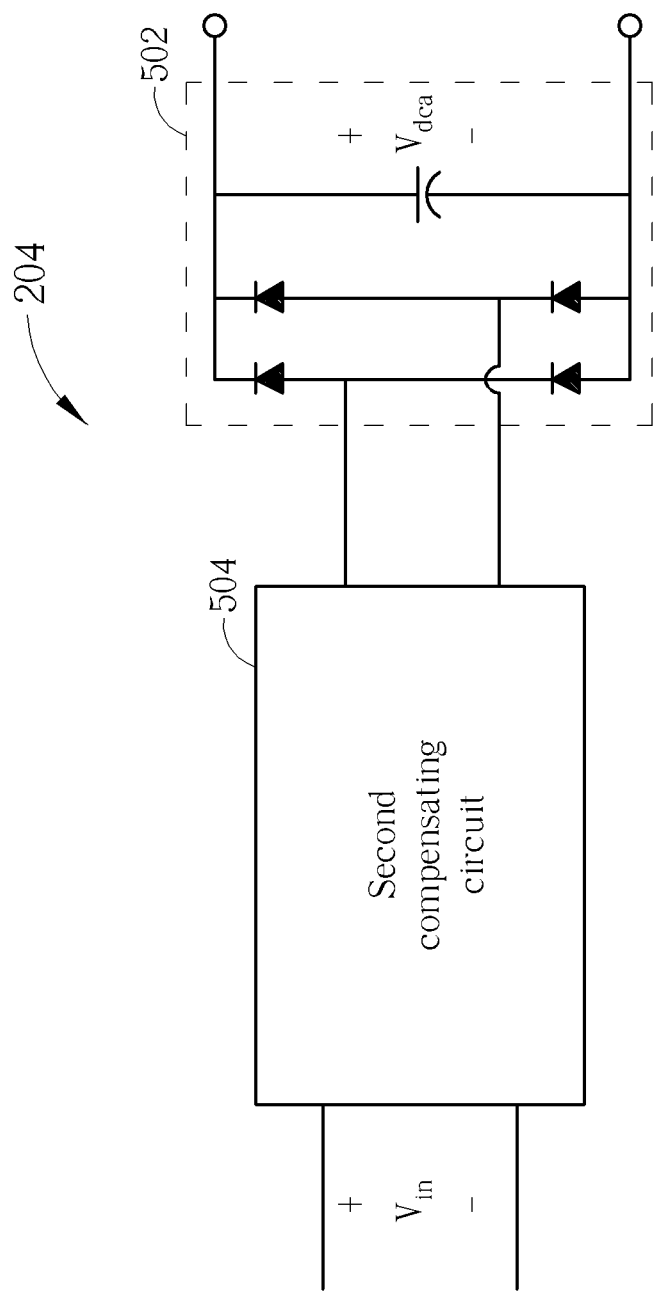
FIG. 5A is a diagram illustrating the power receiver according to an embodiment.
Figure 5B:
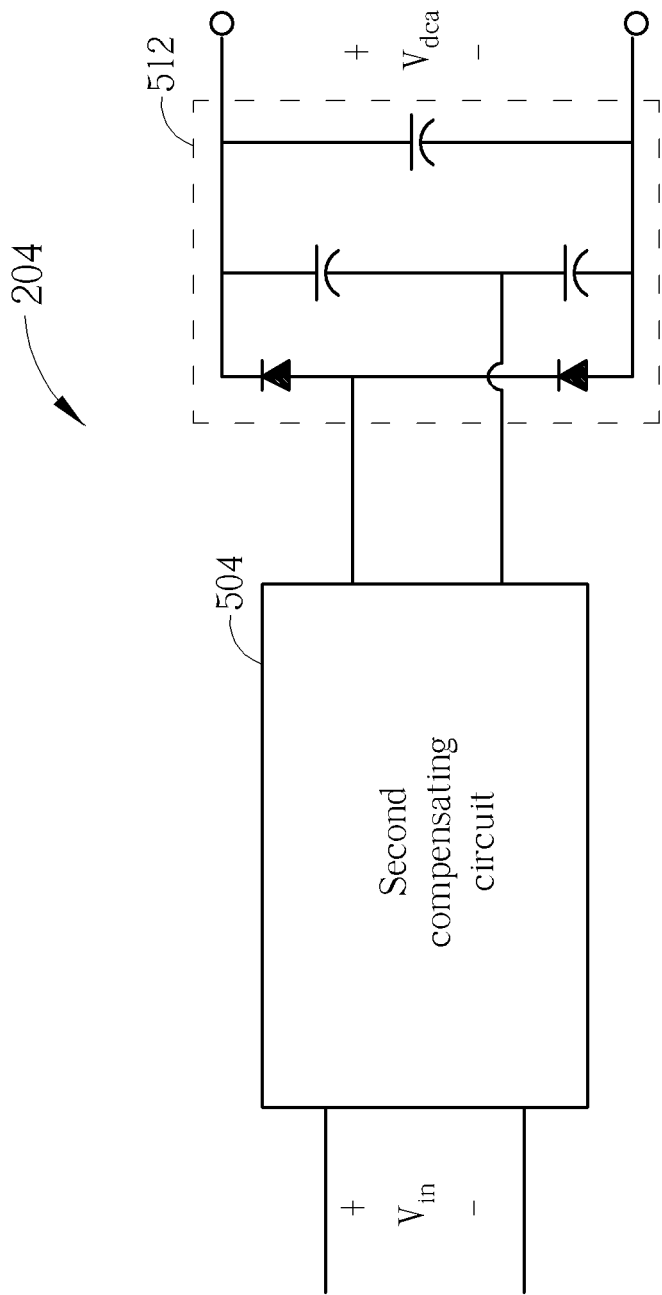
FIG. 5B is a diagram illustrating the power receiver according to another embodiment.

The power receiver 204 is used to convert AC voltage to DC voltage. The power receiver 204 is coupled to the first transmission unit 206 for receiving and rectifying the power from the first transmission unit 206. FIG. 5A is a diagram illustrating the power receiver 204 according to an embodiment. FIG. 5A shows a full bridge rectifier 502 and a second compensating circuit 504. FIG. 5B is a diagram illustrating the power receiver 204 according to another embodiment. FIG. 5B shows a half bridge rectifier 512 and the second compensating circuit 504. Rectifiers in the power receiver 204 may be composed of other active components such as MOSFET or IGBT rectifiers. $V_{in}$ is AC voltage inputting from the second inductive element 2064 to the power receiver 204, and $V_{dca}$ is DC voltage outputting from the power receiver 204. The second compensating circuit 504 may be composed of a capacitor and an inductor connected in parallel or in series with the converter. The inductor may be removed from the second compensating circuit 504, leaving only the capacitor connected in parallel or in series with the converter to form the second compensating circuit 504.

The feedback receiver 2122 of the feedback regulator 212 is coupled to the power receiver 204 for receiving a feedback signal $S_{fb}$ from the power receiver 204. The feedback signal $S_{fb}$ may be a signal at any circuit node of the power receiver 204, so the feedback signal $S_{fb}$ may be a DC signal or an AC signal and may be a voltage type or a current type. The command adjuster 2124 of the feedback regulator 212 is coupled to the feedback receiver 2122 for generating an AC control signal $S_c$.

Figure 6A:
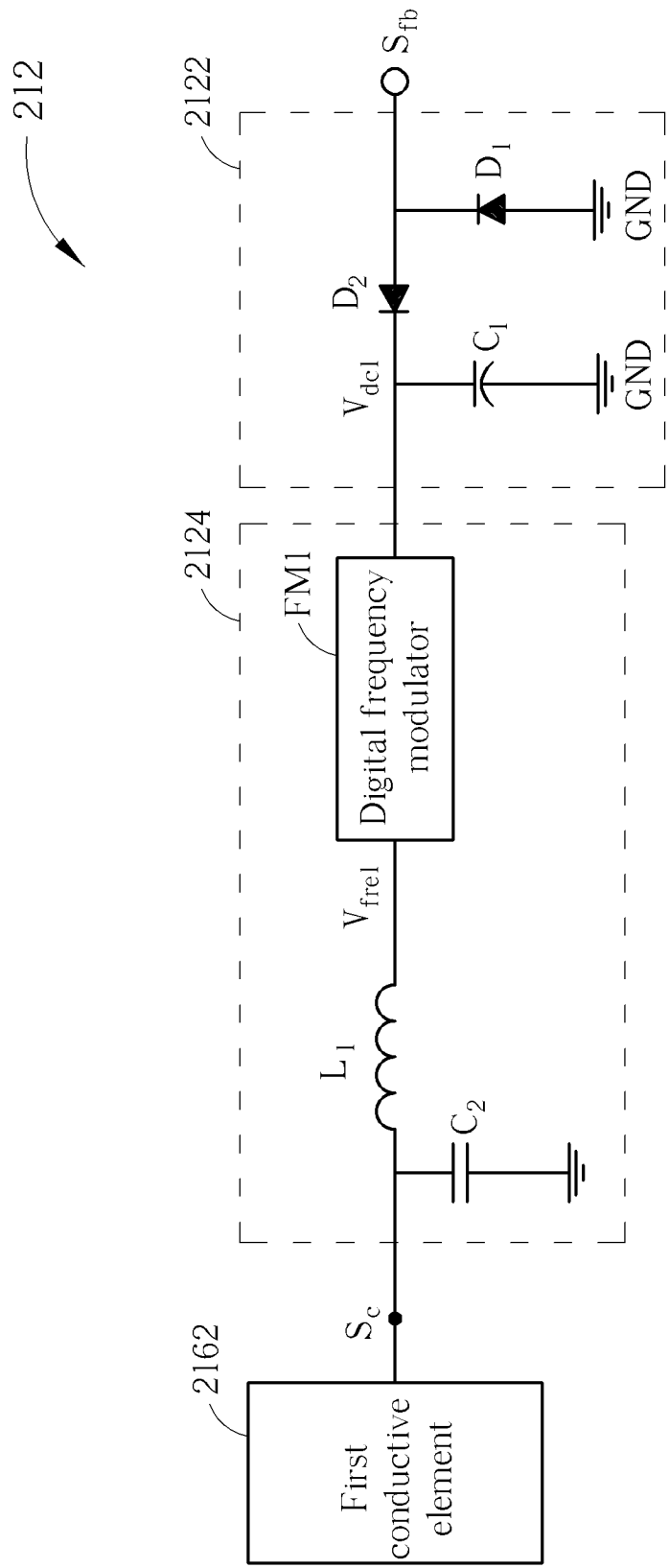
FIG. 6A is a diagram illustrating the feedback regulator according to an embodiment.

FIG. 6A is a diagram illustrating the feedback regulator 212 according to an embodiment. The feedback receiver 2122 of FIG. 6A may include a rectifier coupled to the power receiver 204 for receiving and rectifying the feedback signal $S_{fb}$ to be a first DC signal $V_{dc1}$. The rectifier may include a first diode D1, a second diode D2, and a first capacitor C1. The first diode D1 has a first end coupled to the power receiver 204 for receiving the feedback signal $S_{fb}$, and a second end for receiving a reference voltage GND. The second diode D2 has a first end and a second end, the second end being coupled to the first end of the first diode D1. The first capacitor C1 has a first end coupled to the first end of the second diode D2, and a second end for receiving the reference voltage GND. The command adjuster 2124 of FIG. 6A may include a digital frequency modulator FM1 and a resonant tank. The digital frequency modulator FM1 is coupled between the feedback receiver 2122 and the first conductive element 2162 for generating a first frequency signal $V_{fre1}$ according to the first DC signal $V_{dc1}$. The digital frequency modulator FM1 modulates the first frequency signal $V_{fre1}$ corresponding to a varying voltage level of the first DC signal $V_{dc1}$. The resonant tank is composed of a second capacitor C2 and a first inductor L1 and is coupled to the digital frequency modulator FM1 for generating the control signal $S_c$ according to the first frequency signal $V_{fre1}$.

Figure 6B:
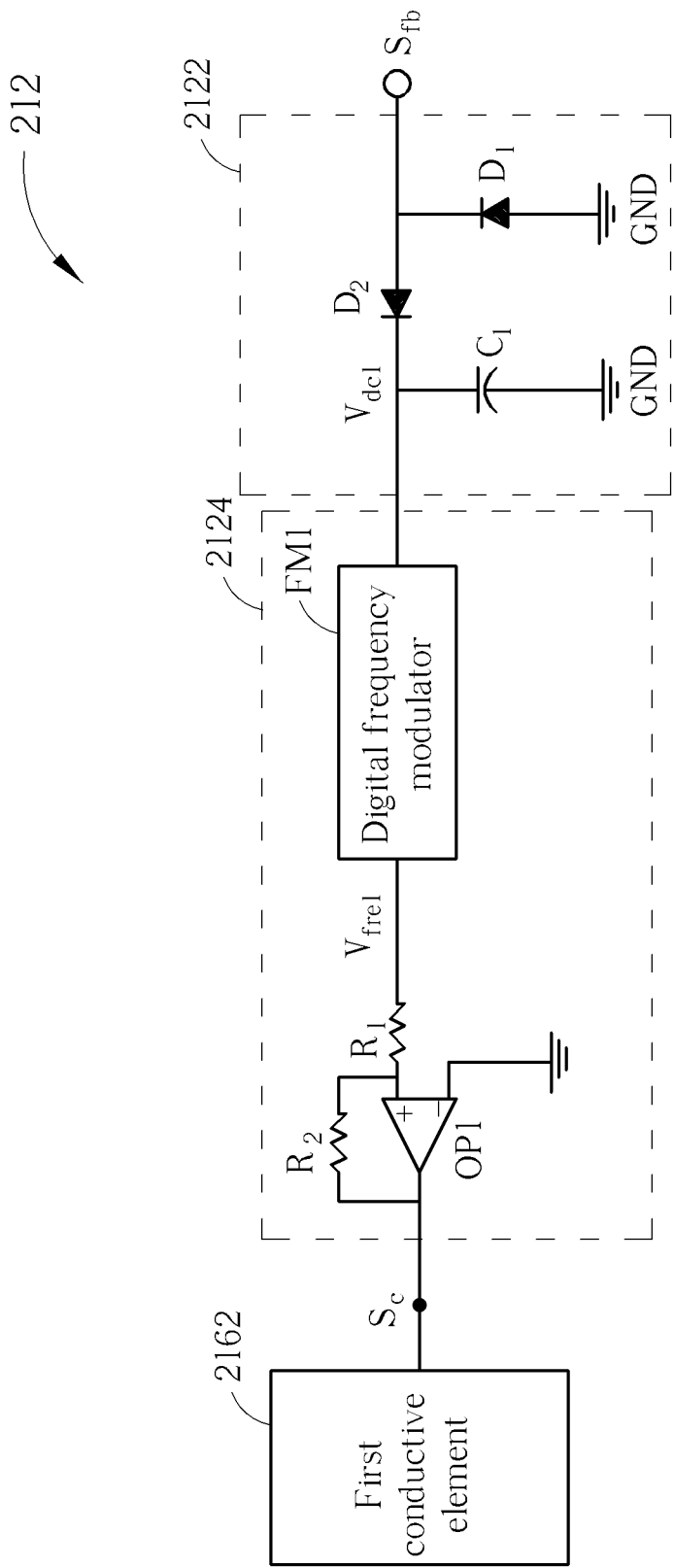
FIG. 6B is a diagram illustrating the feedback regulator according to another embodiment.

FIG. 6B is a diagram illustrating the feedback regulator 212 according to another embodiment. The feedback receiver 2122 of FIG. 6B may include the same components as shown in FIG. 6A and is coupled to the power receiver 204 for receiving and rectifying the feedback signal $S_{fb}$ to be the first DC signal $V_{dc1}$. The command adjuster 2124 of FIG. 6B may include the digital frequency modulator FM1 and a first amplify circuit. The digital frequency modulator FM1 of FIG. 6B is coupled in the same way as in FIG. 6A and detailed description will be omitted. The first amplify circuit may include a first amplifier OP1, a first resistor R1, and a second resistor R2. The first amplify circuit is coupled to the digital frequency modulator FM1 for generating the control signal $S_c$ by amplifying the first frequency signal $V_{fre1}$.

Figure 6C:
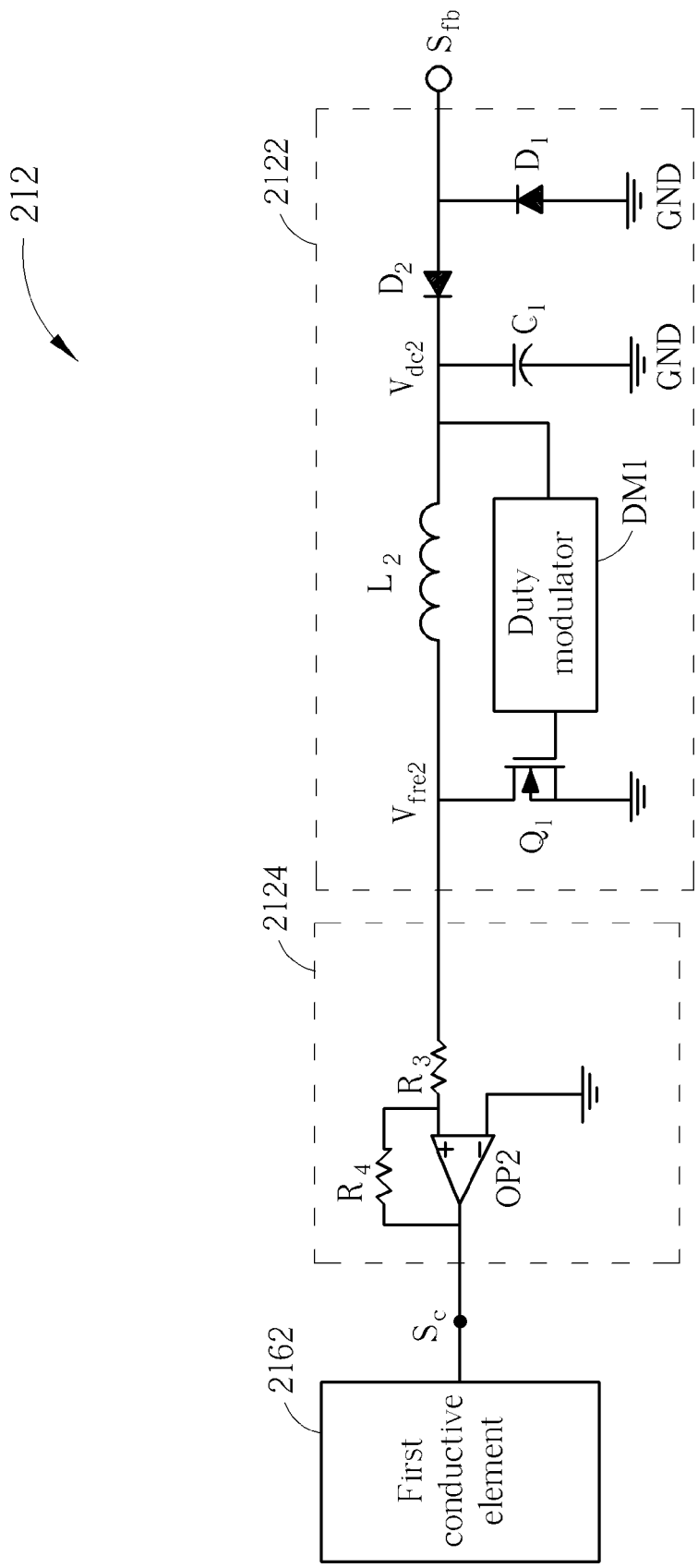
FIG. 6C is a diagram illustrating the feedback regulator according to another embodiment.

FIG. 6C is a diagram illustrating the feedback regulator 212 according to another embodiment. The feedback receiver 2122 of FIG. 6C may include the rectifier, a duty modulator DM1, a second inductor L2, and a switch Q1. The rectifier may include the same components as shown in FIG. 6A and is coupled to the power receiver 204 for receiving and rectifying the feedback signal $S_{fb}$ to be a second DC signal $V_{dc2}$. A circuit formed by the duty modulator DM1, the second inductor L2, and the switch Q1 may be used to receive the second DC signal $V_{dc2}$ for generating a duty signal $V_{fre2}$ corresponding to the second DC signal $V_{dc2}$. The duty modulator DM1 generates a duty cycle corresponding to a varying voltage level of the second DC signal $V_{dc2}$ and the duty signal $V_{fre2}$ is then generated by the circuit formed by the second inductor L2 and the switch Q1 so that duty cycle of the duty signal $V_{fre2}$ varies corresponding to the voltage level of the second DC signal $V_{dc2}$. The command adjuster 2124 of FIG. 6C may include a second amplify circuit. The second amplify circuit may include a second amplifier OP2, a third resistor R3, and a fourth resistor R4. The second amplify circuit is coupled to the feedback receiver 2122 for generating the control signal $S_c$ by amplifying the duty signal $V_{fre2}$.

Figure 7:
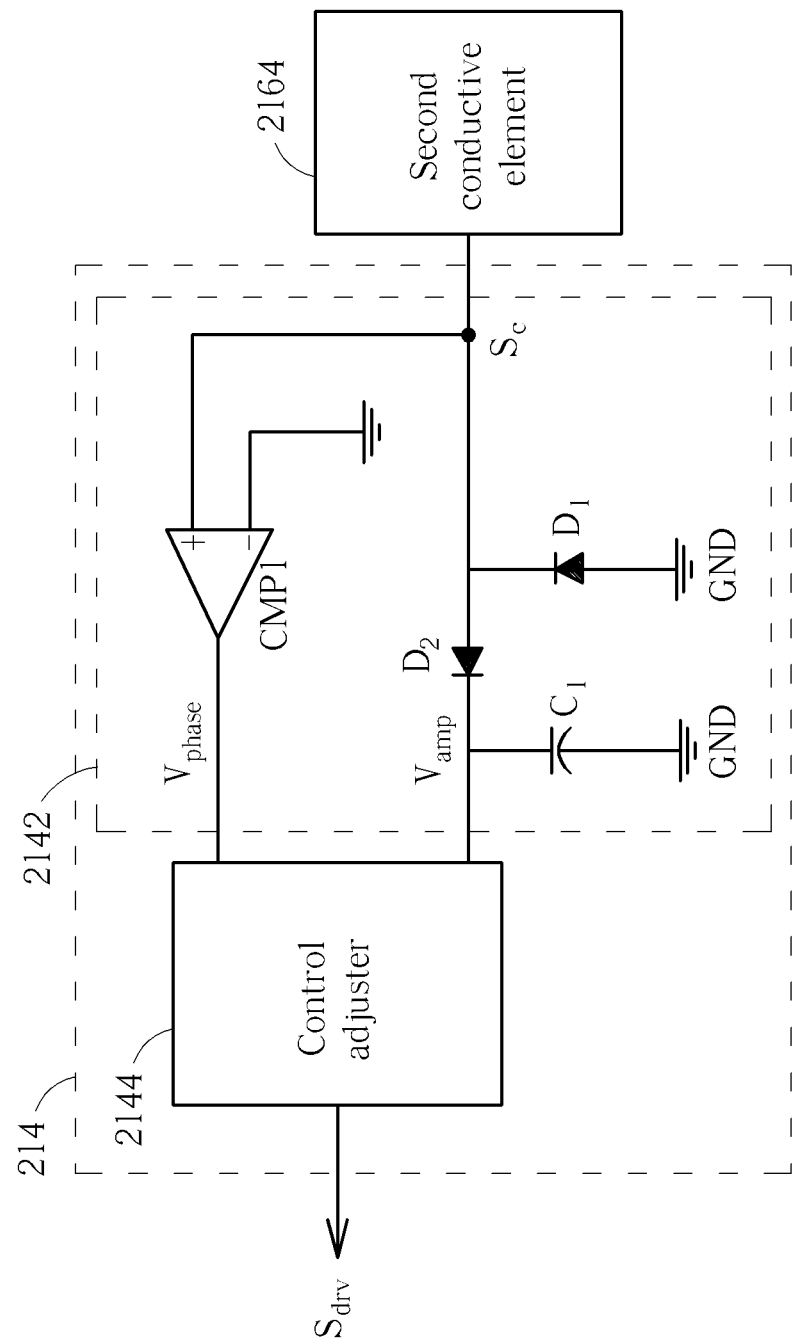
FIG. 7 is a diagram illustrating the receive controller according to an embodiment.

The feedback judge controller 2142 of the receive controller 214 is for receiving the control signal $S_c$. The control adjuster 2144 of the receive controller 214 is coupled between the feedback judge controller 2142 and the power transmitter 202 for generating a driving signal $S_{drv}$ to adjust the power generated by the power transmitter 202. FIG. 7 is a diagram illustrating the receive controller 214 according to an embodiment. The feedback judge controller 2142 in FIG. 7 may include a comparator CMP1 and a rectifier. The comparator CMP1 is coupled between the second conductive element 2164 of the second transmission unit 216 and the control adjuster 2144 for receiving the AC control signal $S_c$ from the second transmission unit 216 and generating a phase signal $V_{phase}$ according to a voltage phase of the control signal $S_c$. The rectifier may include the same components as shown in FIG. 6A. The rectifier is coupled between the second conductive element 2164 of the second transmission unit 216 and the control adjuster 2144 for generating an amplitude signal $V_{amp}$ according to a voltage amplitude of the control signal $S_c$. The control adjuster 2144 of FIG. 7 may be an analog circuit or a digital integrated circuit for interpreting a command implied in the voltage amplitude and frequency of the control signal $S_c$ so as to generate a driving signal $S_{drv}$ according to the phase signal $V_{phase}$ and the amplitude signal $V_{amp}$. The driving signal $S_{drv}$ contains plural sets of signals having continuously changing duty cycle and frequency for driving the converter of the power transmitter 202 to convert DC voltage to AC voltage.

The first conductive element 2162 of the second transmission unit 216 is coupled to the feedback regulator 212. The second conductive element 2164 is coupled to the receive controller 214. The first conductive element 2162 and the second conductive element 2164 are used to wirelessly transmit the control signal $S_c$, and the first conductive element 2162 and the second conductive element 2164 do not contact physically. A distance d between the first conductive element 2162 and the second conductive element 2164 may be an arbitrary value. Transmission of the control signal $S_c$ must be accurate and not be interfered, and power loss in the transmission should be as low as possible. Since transmission via inductive coils may result in greater power loss, the first conductive element 2162 and the second conductive element 2164 may be conductive boards such as printed circuit boards, or metal probes in order to reduce interference and power loss. The first conductive element 2162 and the second conductive element 2164 are respectively disposed in different housings, which are separated physically. Thus the control signal $S_c$ can be transmitted from the power receiver 204 to the power transmitter 202 without using RFID system and can be transmitted in a separate transmission unit other than the first transmission unit 206 used to the power transmission. In so doing, interference caused by coils may be reduced and control errors and instability may be alleviated, thereby increasing stability and power level that can be transferred.

Figure 8:
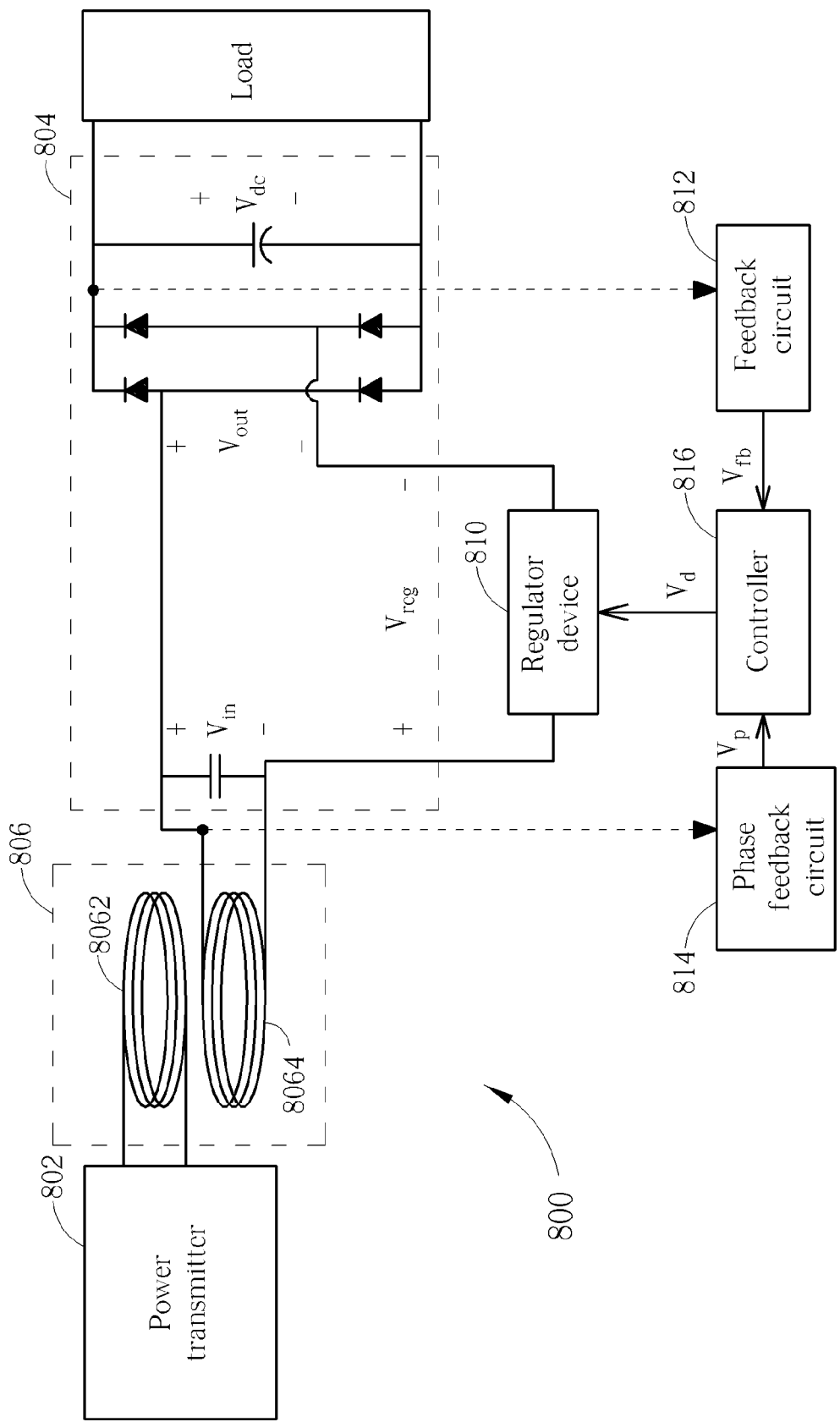
FIG. 8 is a diagram illustrating a wireless power transmission device.

Please refer to FIG. 8, which is a diagram illustrating a wireless power transmission device 800. The wireless power transmission device 800 may include a power transmitter 802, a first transmission unit 806, a power receiver 804, a feedback circuit 812, a phase feedback circuit 814, a controller 816, and a regulator device 810. The first transmission unit 806 may include a first inductive element 8062 and a second inductive element 8064. The feedback circuit 812, the phase feedback circuit 814, and the controller 816 may be an analog circuit, or be integrated in an analog integrated circuit or a digital integrated circuit.

Circuit structures of the power transmitter 802 and the first transmission unit 806 are the same as the power transmitter 202 and the first transmission unit 206, detailed description being omitted.

The power receiver 804 is coupled to the first transmission unit 806 for receiving and rectifying the power from the first transmission unit 806. $V_{in}$ is an input voltage of the power receiver 804, $V_{out}$ is a pre-rectified output voltage of the power receiver 804, and $V_{dc}$ is a rectified output voltage of the power receiver 804.

Figure 9:
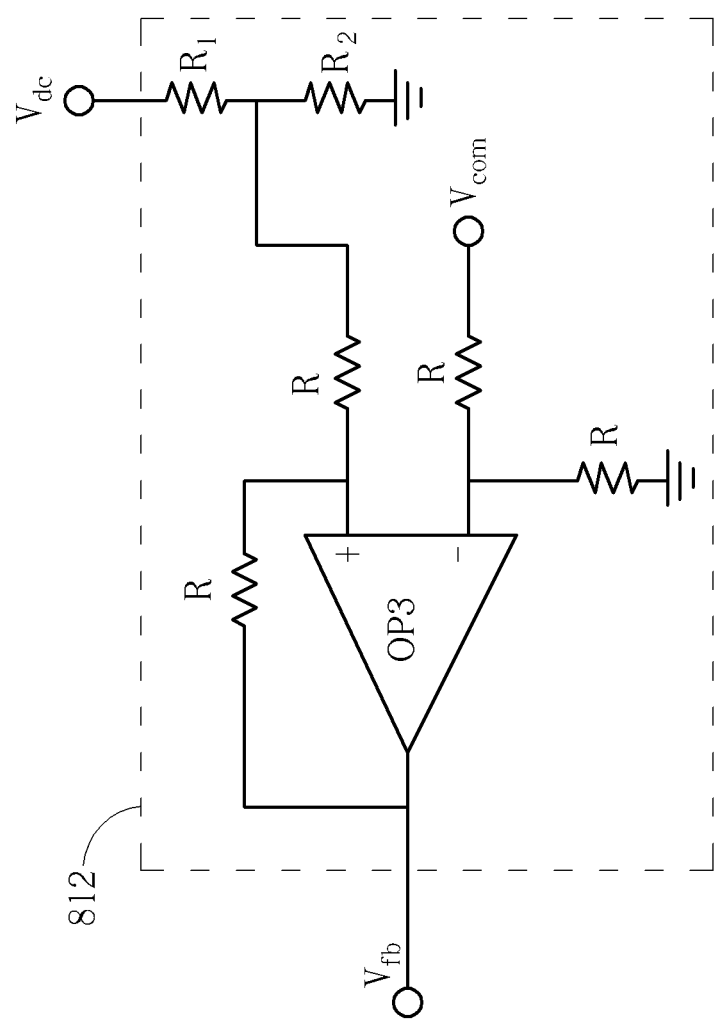
FIG. 9 is a diagram illustrating the feedback circuit according to an embodiment.

The feedback circuit 812 is coupled to the power receiver 804 for detecting the rectified output voltage $V_{dc}$ of the power receiver 804 to generate a feedback control signal $V_{fb}$. The feedback control signal $V_{fb}$ may be a DC voltage signal. FIG. 9 is a diagram illustrating the feedback circuit 812 according to an embodiment. The feedback circuit 812 may include a third amplify circuit. The third amplify circuit includes a third amplifier OP3, a first resistor R1, a second resistor R2, and a plurality of resistors R. The first resistor R1 and the second resistor R2 of the feedback circuit 812 is used to divide the rectified output voltage $V_{dc}$. The third amplifier OP3 compares the divided $V_{dc}$ with a predetermined voltage level $V_{com}$ and outputs a difference signal at an output end of the third amplifier OP3 to be the feedback control signal $V_{fb}$ for the controller 816. The difference signal may be a positive voltage signal or a negative voltage signal so that the controller 816 may output a compensating voltage $V_d$ either in phase or out of phase to the regulator device 810 in order to control the rectified output voltage $V_{dc}$ of the power receiver 804. Amplitude of the feedback control signal $V_{fb}$ may be adjusted by adjusting values of the plurality of resistors R. In another embodiment, the feedback circuit 812 may be a subtractor.

The phase feedback circuit 814 is coupled to the power receiver 804 for detecting a phase of the input voltage $V_{in}$ of the power receiver 804 to generate a phase signal $V_p$. The phase signal $V_p$ may be an AC voltage signal.

Figure 10A:
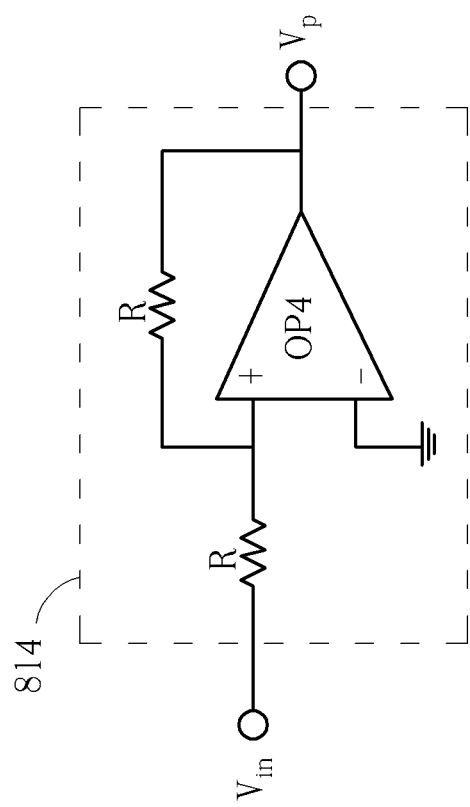
FIG. 10A is a diagram illustrating the phase feedback circuit according to an embodiment.

FIG. 10A is a diagram illustrating the phase feedback circuit 814 according to an embodiment. The phase feedback circuit 814 of FIG. 10A may include a fourth amplify circuit. The fourth amplify circuit may include a fourth amplifier OP4 and a plurality of resistors R, which form a non-inverting amplifier. The phase signal $V_p$ may be adjusted to be bigger than the input voltage $V_{in}$ by adjusting values of the plurality of resistors R.

Figure 10B:
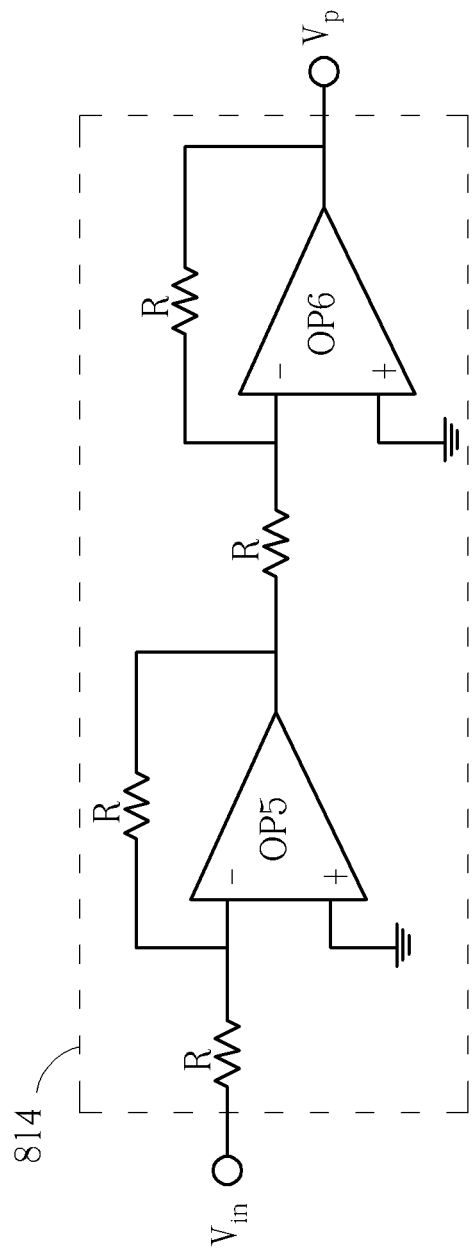
FIG. 10B is a diagram illustrating the phase feedback circuit according to another embodiment.

FIG. 10B is a diagram illustrating the phase feedback circuit 814 according to another embodiment. The phase feedback circuit 814 of FIG. 10B may include a fifth and a sixth amplify circuits, which form two sets of inverting amplifiers. The fifth amplify circuit may include a fifth amplifier OP5 and a plurality of resistors R, and the sixth amplify circuit may include a sixth amplifier OP6 and a plurality of resistors R. The phase signal $V_p$ may be adjusted to be smaller than the input voltage $V_{in}$ by adjusting values of the plurality of resistors R. The purpose of adjusting the phase signal $V_p$ is that the controller 816 and the regulator device 810 can operate in a wider voltage range.

Figure 10C:
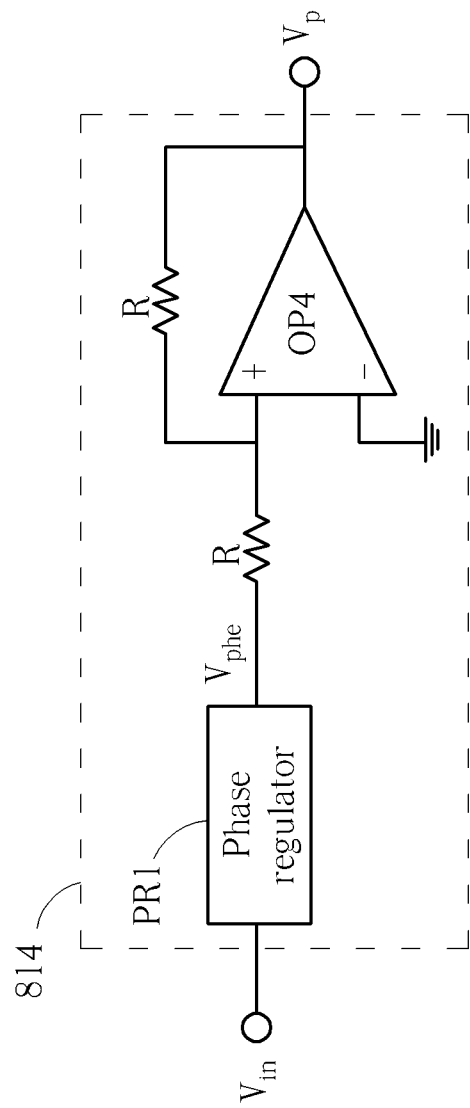
FIG. 10C is a diagram illustrating the phase feedback circuit according to another embodiment.

FIG. 10C is a diagram illustrating the phase feedback circuit 814 according to another embodiment. The phase feedback circuit 814 of FIG. 10C may include the fourth amplify circuit of FIG. 10A and a phase regulator PR1. The phase regulator PR1 includes a zero cross detector and a bandpass filter (BPF). A zero cross of the input voltage $V_{in}$ is detected by the zero cross detector, then a phase of the zero cross is adjusted by the bandpass filter so that a phase adjusting signal $V_{phe}$ outputted by the phase regulator PR1 has a phase different from the zero cross of the input voltage $V_{in}$.

Figure 10D:
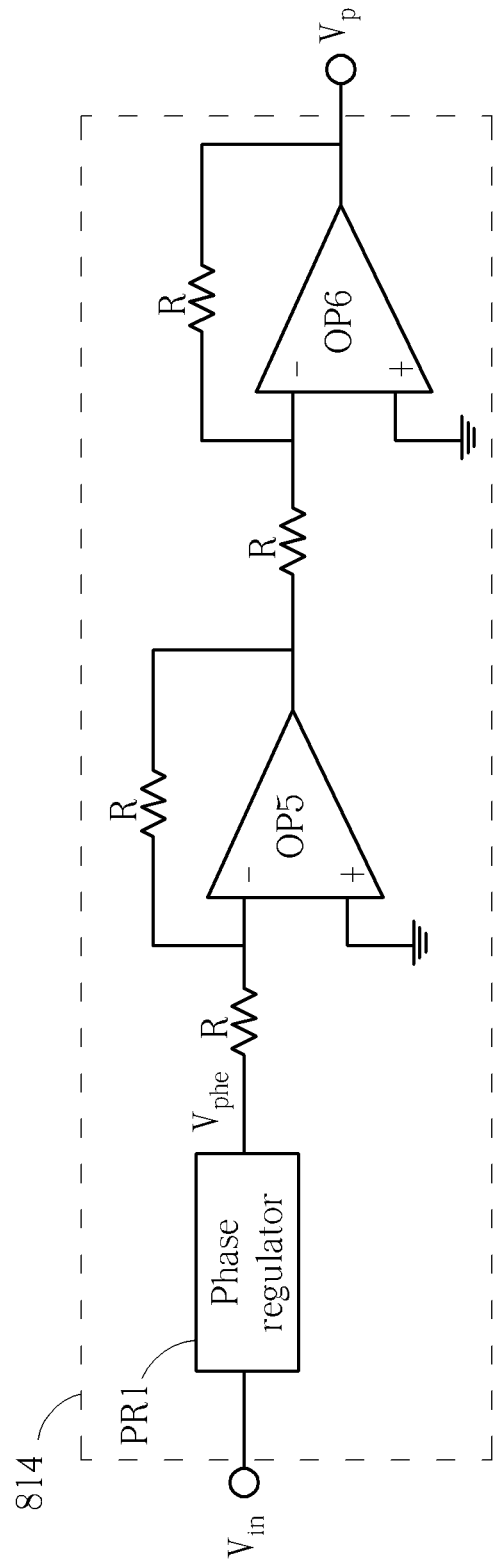
FIG. 10D is a diagram illustrating the phase feedback circuit according to another embodiment.

FIG. 10D is a diagram illustrating the phase feedback circuit 814 according to another embodiment. The phase feedback circuit 814 of FIG. 10D may include the fifth and the sixth amplify circuits of FIG. 10B and the phase regulator PR1. The phase regulator PR1 is coupled to the fifth amplify circuit and has the same structure and purpose as set forth in FIG. 10C.

Figure 10E:
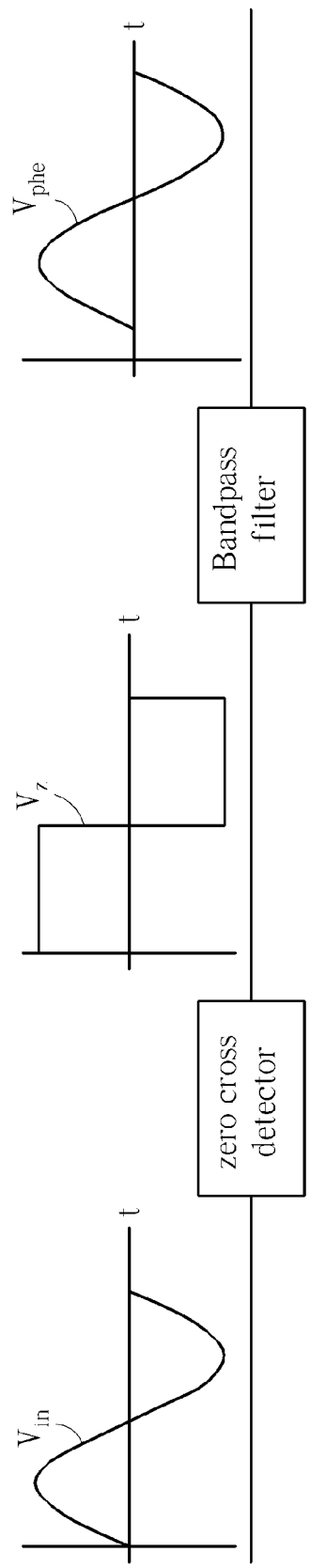
FIG. 10E is a diagram illustrating operations of the phase regulator.

FIG. 10E is a diagram illustrating operations of the phase regulator PR1. As shown in FIG. 10E, a square wave signal $V_z$ is generated when the input voltage $V_{in}$ passes through the zero cross detector, then a phase and an amplitude of the square wave signal $V_z$ is adjusted by the bandpass filter to generate the phase adjusting signal $V_{phe}$ outputted to the amplify circuits. Thus the phase adjusting signal $V_{phe}$ and the phase signal $V_p$ have phases different from the input voltage $V_{in}$ so that the controller 816 may output the compensating voltage $V_d$ having a phase difference to the regulator device 810.

Figure 11:
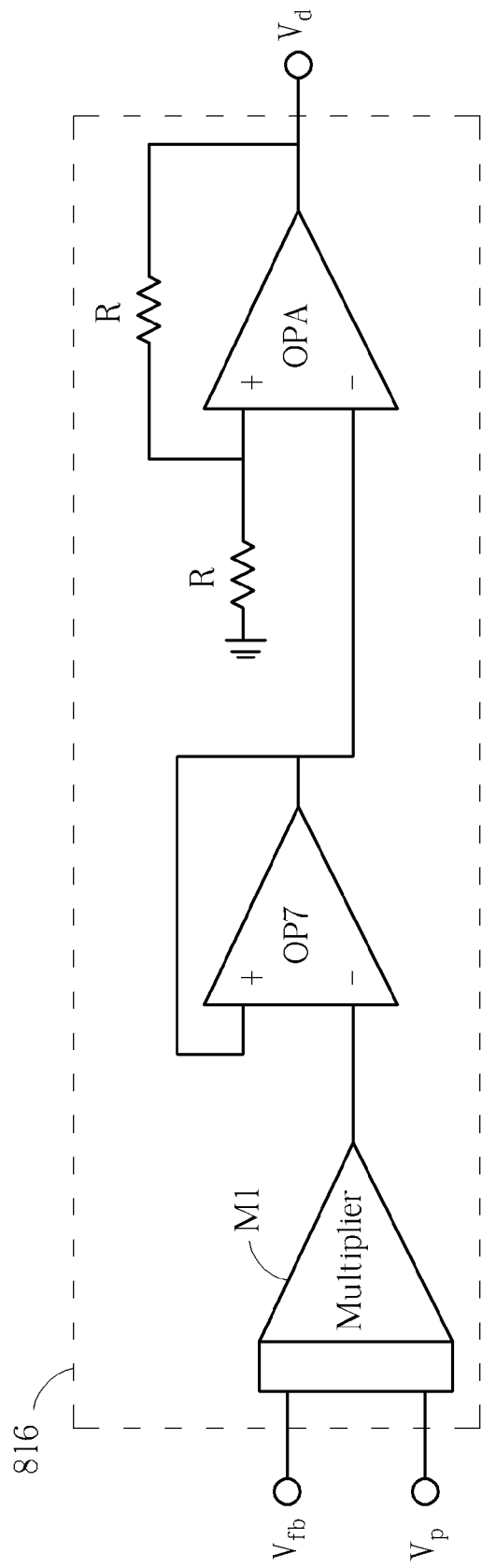
FIG. 11 is a diagram illustrating the controller according to an embodiment.

The controller 816 is coupled between the feedback circuit 812 and the phase feedback circuit 814 for generating the compensating voltage $V_d$ according to the feedback control signal $V_{fb}$ and the phase signal $V_p$. The feedback control signal $V_{fb}$ may be a DC voltage signal and the phase signal $V_p$ may be an AC voltage signal. FIG. 11 is a diagram illustrating the controller 816 according to an embodiment. The controller 816 may include a multiplier M1, a seventh amplifier OP7, an eighth amplifier OPA, and a plurality of resistors R. The multiplier M1 of the controller 816 multiplies the feedback control signal $V_{fb}$ and the phase signal $V_p$ to derive a predetermined compensating voltage. A non-inverting amplifier composed of the seventh amplifier OP7, the eighth amplifier OPA, which is a high power amplifier, and a plurality of resistors R amplifies the predetermined compensating voltage to be the compensating voltage $V_d$. The higher the feedback control signal $V_{fb}$ is, the higher the predetermined compensating voltage will be. If the feedback control signal $V_{fb}$ is positive, the predetermined compensating voltage will be in phase. If the feedback control signal $V_{fb}$ is negative, the predetermined compensating voltage will be out of phase. The seventh amplifier OP7 is a voltage follower for stabilizing the predetermined compensating voltage, and the eighth amplifier OPA is a high power amplifier for outputting the compensating voltage $V_d$ to the regulator device 810 so as to stabilize the pre-rectified output voltage $V_{out}$.

Figure 12A:
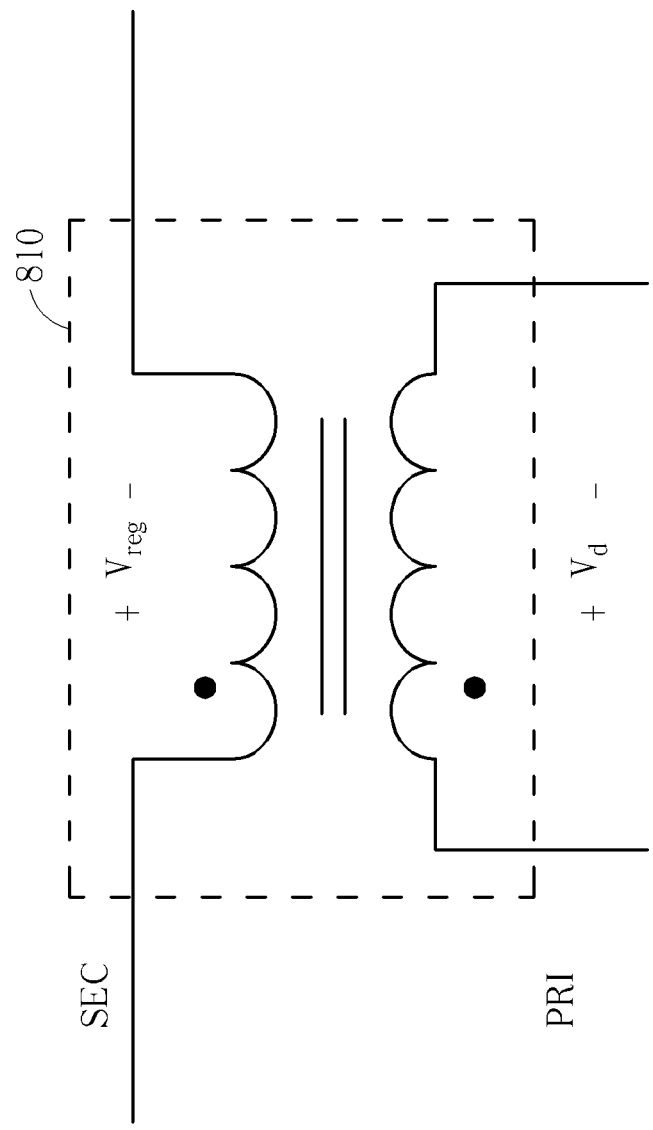
FIG. 12A is a diagram illustrating the regulator device according to an embodiment.
Figure 12B:
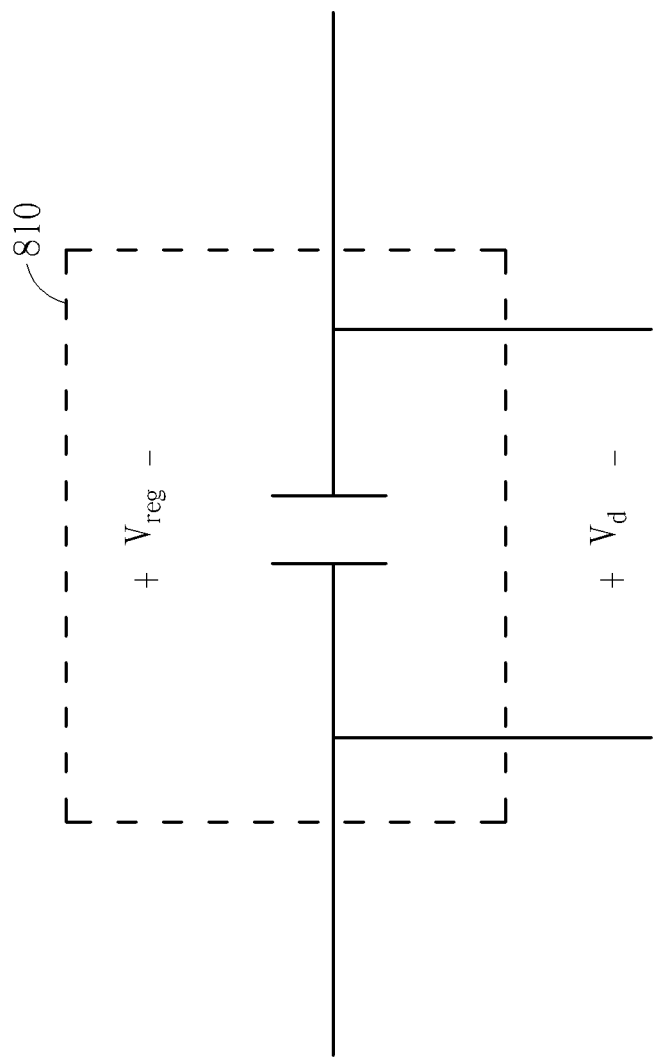
FIG. 12B is a diagram illustrating the regulator device according to another embodiment.

The regulator device 810 is coupled between the controller 816 and the power receiver 804 for generating a regulating voltage $V_{reg}$, which is in phase or out of phase with the input voltage $V_{in}$, according to the compensating voltage $V_d$ to regulate the pre-rectified output voltage $V_{out}$ of the power receiver 804. FIG. 12A is a diagram illustrating the regulator device 810 according to an embodiment. The regulator device 810 of FIG. 12A is a transformer having a primary winding PRI and a secondary winding SEC. The primary winding PRI receives the compensating voltage $V_d$ from the controller 816 and the secondary winding SEC is connected in series between the input voltage $V_{in}$ and the pre-rectified output voltage $V_{out}$. A turn ratio of the transformer may be used to adjust ratios between the compensating voltage $V_d$ and the regulating voltage $V_{reg}$ so that the regulator device may regulate a wider voltage range. FIG. 12B is a diagram illustrating the regulator device 810 according to another embodiment. The regulator device 810 of FIG. 12B is a capacitor directly connected in series between the input voltage $V_{in}$ and the pre-rectified output voltage $V_{out}$. The compensating voltage $V_d$ in the case of FIG. 12B is substantially equal to the regulating voltage $V_{reg}$. The regulator device 810 may be composed of other passive components or coupling components other than those in FIG. 12A and FIG. 12B.

FIG. 12C is a diagram illustrating operations of the regulator device 810. In FIG. 12C, the input voltage $V_{in}$ is lower than voltage required by the pre-rectified output voltage $V_{out}$, so the regulator device 810 connected in series may add the regulating voltage $V_{reg}$ in phase with the input voltage $V_{in}$ to stabilize the pre-rectified output voltage $V_{out}$. FIG. 12D is another diagram illustrating operations of the regulator device 810. In FIG. 12D, the input voltage $V_{in}$ is higher than voltage required by the pre-rectified output voltage $V_{out}$, so the regulator device 810 connected in series may add the regulating voltage $V_{reg}$ out of phase with the input voltage $V_{in}$ to stabilize the pre-rectified output voltage $V_{out}$. In addition to operations illustrated in FIG. 12C and FIG. 12D, the phase feedback circuit 814 may generate the phase signal $V_p$ having a phase different from the input voltage $V_{in}$ after detecting the phase of the input voltage $V_{in}$, and the phase signal $V_p$ may be used to generate the regulating voltage $V_{reg}$ having a phase different from the input voltage $V_{in}$ through the controller 816 and the regulator device 810 to regulate the pre-rectified output voltage $V_{out}$ in order to compensate a power factor of the wireless power transmission device 800.

In summary, embodiments of the present invention can transmit the control signal $S_c$ from the power transmitter 204 to the power receiver 202 without employing additional RFID chips and do not share the same first transmission unit 206 used for the power transmission. Thus the present invention can reduce interference, control errors, and instability, thereby increasing stability and power level of wireless power transmission. Embodiments of the present invention also provide simple circuit structures as the regulator device 810 to regulate the pre-rectified output voltage $V_{out}$ by using a voltage in phase or out of phase with the input voltage $V_{in}$ so as to stabilize the pre-rectified output voltage $V_{out}$ and the rectified output voltage $V_{dc}$/thus no additional DC to DC converter is required to be employed in the power receiver 804.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless power transmission device comprising:
a power transmitter for generating power;
a first transmission unit coupled to the power transmitter for wirelessly transmitting the power generated by the power transmitter;
a power receiver coupled to the first transmission unit for receiving and rectifying the power from the first transmission unit;
a feedback circuit coupled to the power receiver for detecting a rectified output voltage of the power receiver to generate a feedback control signal;
a phase feedback circuit coupled to the power receiver for detecting a phase of an input voltage of the power receiver to generate a phase signal, wherein the phase signal is an AC signal and the phase feedback circuit comprises at least one amplify circuit for detecting input voltage of the power receiver to generate the phase signal and further comprises a phase regulator coupled between the power receiver and the at least one amplify circuit, the phase regulator comprising a zero cross detector and a bandpass filter for detecting a zero cross of the input voltage and generating a phase regulating signal through the bandpass filter;
a controller coupled between the feedback circuit and the phase feedback circuit for generating a compensating voltage according to the feedback control signal and the phase signal; and
a regulator device coupled between the controller and the power receiver for generating a regulating voltage according to the compensating voltage to regulate a pre-rectified output voltage of the power receiver by an in phase form or an out of phase form.

2. The wireless power transmission device of claim 1 wherein the feedback circuit comprises:
an amplifier;
a first resistor and a second resistor coupled to the amplifier for dividing the rectified output voltage of the power receiver; and
a plurality of resistors coupled to the amplifier.

3. The wireless power transmission device of claim 1 wherein the feedback control signal is a DC voltage signal.

4. The wireless power transmission device of claim 1 wherein generating the compensating voltage according to the feedback control signal and the phase signal is performed by computing the feedback control signal and the phase signal to derive a predetermined compensating voltage and outputting the predetermined compensating voltage via a set of amplify circuits to generate the compensating voltage.

5. The wireless power transmission device of claim 1 wherein the regulator device is a transformer or a capacitor.

6. The wireless power transmission device of claim 1 wherein the rectified output voltage of the power receiver is a DC voltage.

* * * * *